Jan. 24, 1950

H. SCHWARTZBERG 2,495,426

SOUND CONTROL SYSTEM

Filed Nov. 26, 1946

INVENTOR
HENRY SCHWARTZBERG
BY
ATTORNEY

Jan. 24, 1950    H. SCHWARTZBERG    2,495,426
SOUND CONTROL SYSTEM

Filed Nov. 26, 1946    2 Sheets-Sheet 2

INVENTOR
HENRY SCHWARTZBERG
BY
ATTORNEY

Patented Jan. 24, 1950

2,495,426

UNITED STATES PATENT OFFICE 2,495,426

SOUND CONTROL SYSTEM

Henry Schwartzberg, Brookline, Mass.

Application November 26, 1946, Serial No. 712,431

11 Claims. (Cl. 179—1)

This invention relates to an improved sound control system for sound picture apparatus.

In systems of this type as heretofore constituted, it has been customary for an observer in the auditorium of a sound picture theatre to judge aurally the proper intensity of sound level and to signal the operator in the projection booth to either raise or lower the sound intensity until the proper level was reached. The sound generated by the projectors is subject to attenuation by various factors in the auditorium, such as the size of the audience, air temperature, etc. These factors are subject to constant change and thus, although the sound level initially may be set at the proper value, it soon varies and frequent appraisals of the sound level by the observer is required with the necessary corrective signals to the booth operator. However, the observer often is subject to aural fatigue, thus rendering him incapable of proper judgment. Also such observers are often prone to neglect signalling the operator except at too infrequent intervals. As a result, the sound reproduction in the usual sound theatre has often been considerably below satisfactory standards.

An object of this invention is to produce a simple, inexpensive and reliable system which will relieve the auditorium observer from the necessity of continually exercising his aural judgment, but which will nevertheless provide the projection booth operator with continuous instructions as to how to adjust the sound projection apparatus for satisfactory auditorium reproduction.

Another object is to provide means which automatically responds to varying conditions of attenuation of the sound to provide the proper compensatory indication to the booth operator.

A further object is to accomplish the foregoing by the use of supersonic vibrations which are projected along a similar path to and are subjected to the same attenuating factors as the audible sound projected by the sonic auditorium projectors.

The foregoing and other objects of this invention will be best understood from the following description of exemplifications thereof, reference being had to the accompanying drawings, wherein.

Figure 2:
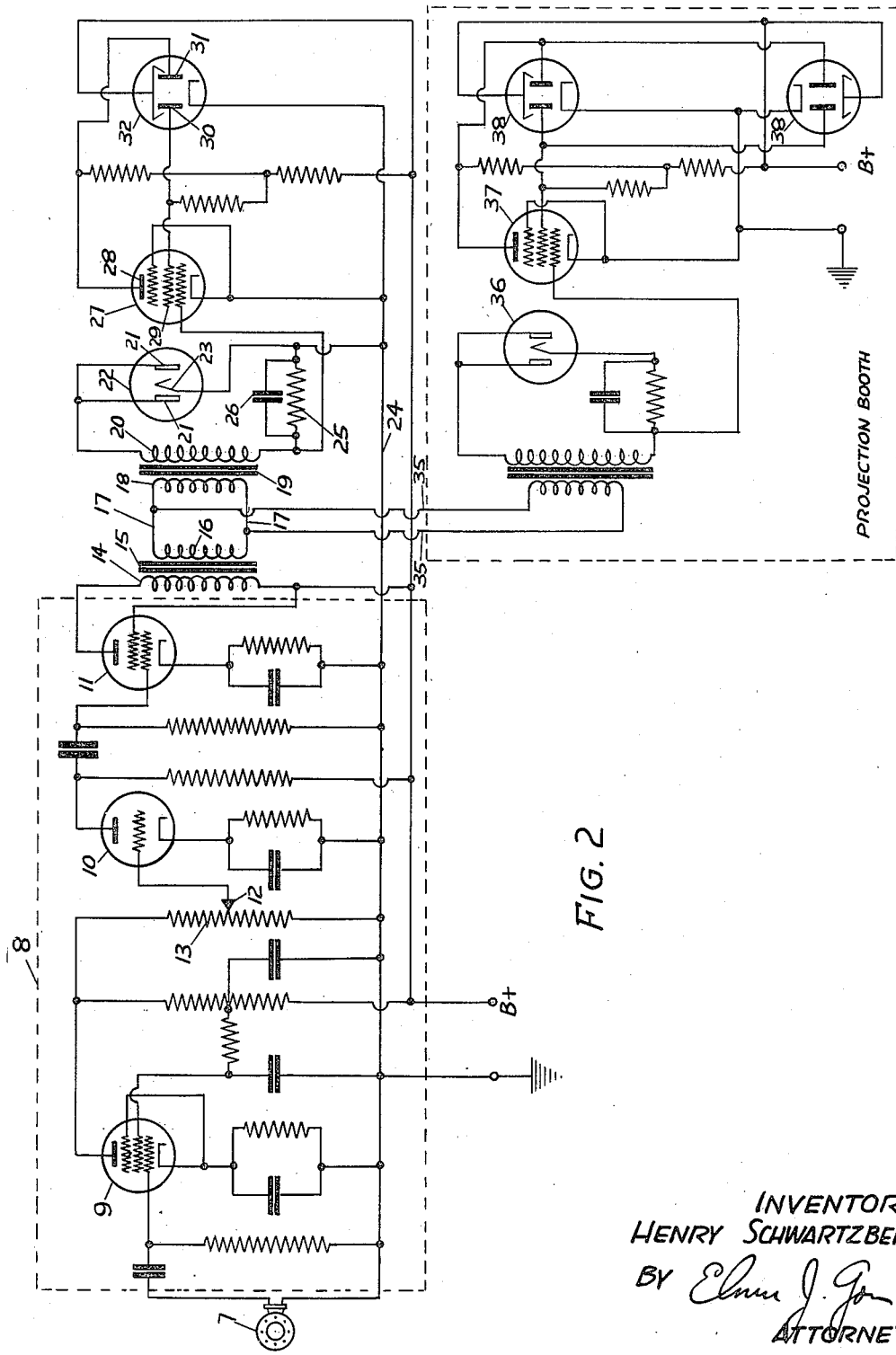
Fig. 2 is a circuit diagram of certain components of the system shown in Fig. 1.

In the drawings, 1 represents a sound picture auditorium, 2 is the projection booth in which is located the controls whereby the operator may adjust the level of sound supplied to the auditorium, and 3 is a supervisory station, such as the office of the theatre manager. Behind the picture screen 4 is the usual sonic projector 5 which projects the audible sounds into the auditorium. Immediately adjacent the sonic projector 5 is a supersonic projector 6 which is oriented so that the supersonic vibrations which it generates are projected along the same path as the audible sounds of the projector 5. It is contemplated that during operation the projector 6 will emit constant supersonic compressional wave energy of a predetermined intensity. Due to the above arrangement, the supersonic compressional wave energy will be subject to the same attenuating factors as those which affect the audible sounds. A microphone or supersonic receiver 7, which is responsive to the supersonic compressional wave energy but not to the audible sounds, is located at a point in the auditorium at which both the audible sounds and the supersonic compressional wave energy have been subjected to the sound attenuating factors in the auditorium. A suitable location is in the rear of the auditorium immediately behind the last row of audience seats. As indicated in Fig. 2, the microphone 7 feeds into a high gain amplifier 8 comprising, for example, a pentode 9, a triode 10 and a tetrode 11 connected in a suitable high gain circuit. The input to the triode 10 is taken from a variable tap 12 on a potentiometer fed with the output of the pentode 9. The tap 12 constitutes a sensitivity control for the amplifier, whereby the level of the output of the amplifier may be varied. The output of the amplifier 8 is fed to the primary 14 of a transformer 15 having a secondary 16. The secondary output leads 17 are connected to the primary 18 of a transformer 19 having a secondary 20. One end of the secondary 20 is connected to the anodes 21 of a rectifier 22, the cathode 23 of which is connected to the ground connector 24. The other end of the secondary 20 is connected through an output resistor 25 in parallel with a condenser 26 to the cathode 23. Thus the rectifier 22 rectifies the output of the amplifier 8, producing a direct current which is a measure of that output. This direct current is amplified in a direct current amplifier comprising a pentode 27. The anode 28 and the number two grid 29 of the pentode 27 are each arranged to produce a direct current output voltage. These two direct current voltages are impressed on the control electrodes 30 and 31 of an indicating tube 32 of the so-called "Magic Eye" type in which a sector-shaped shadow is produced in a circular fluorescent screen, the larger the voltage on the control electrodes, the narrower being the shadow.

Figure 1:
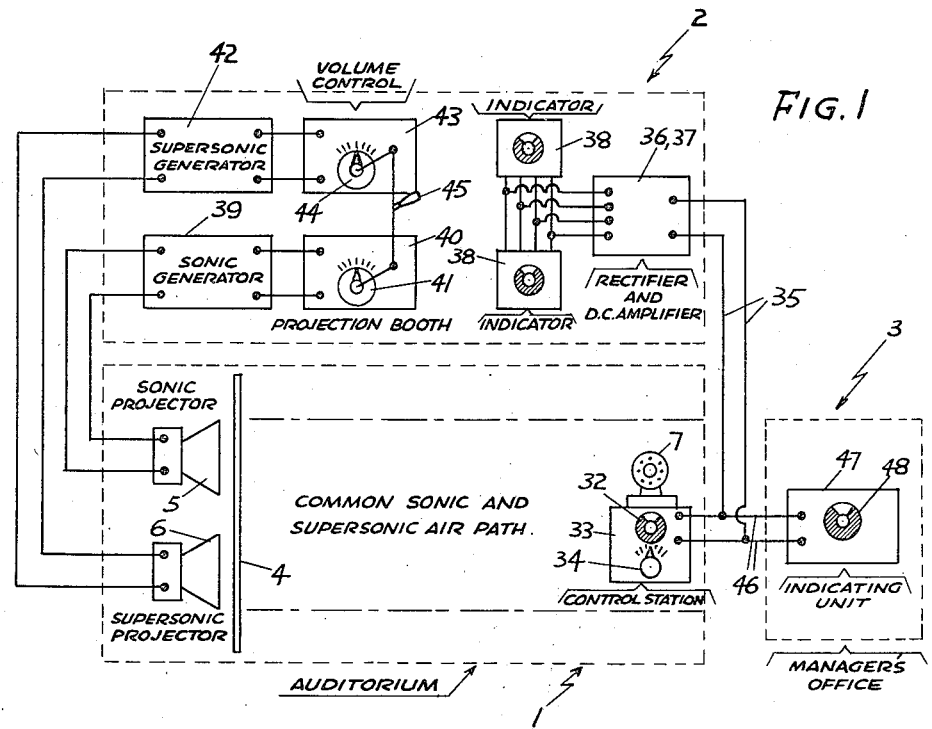
Fig. 1 is a diagrammatic representation of a system incorporating my invention.

The amplifier 8, the rectifier 22, the direct current amplifier 27 and the indicator tube 32 are all located at a control station 33 which, as shown in Fig. 1, is preferably immediately adjacent the microphone 7 in a location in the auditorium readily accessible to the auditorium observer. The sensitivity control 12 may conveniently be adjusted by a control knob 34 on the exterior of the control station 33.

In order to convey the necessary information to the projection booth operator, a pair of leads 35 (Fig. 2) are connected to the leads 17. The leads 35 extend into the projection booth where they are used to feed a rectifier 36 and a direct current amplifier identically as described in connection with the rectifier 22 and direct current amplifier 27. Since the projection booth usually has a plurality of motion picture projectors at any one of which the operator may be at any given time, the output of the direct current amplifier 37 preferably is used to feed a plurality of indicator tubes 38 in parallel, so that an indicator tube may be mounted adjacent each motion picture projector where it is most conveniently observable by the operator.

The projection booth is provided with the usual sonic generator 39 (Fig. 1) which translates the sound record on the moving picture film into the proper audio currents to be supplied to the sonic projector 5. The generator is also provided with one or more volume controls 40 having a control element 41, whereby the operator may adjust the volume of the sound to any desired level. Also located in the projection booth 2 is a supersonic generator 42 adapted to generate the proper supersonic frequency current to be supplied to the supersonic projector 6. The supersonic generator 42 is also provided with a volume control 43 having a control element 44, whereby the volume of the supersonic vibrations may likewise be adjusted. The control elements 41 and 44 are connected together to be operated by a common control element 45. The joint movement of the control elements 41 and 44 is so arranged that the volume generated by the supersonic generator 42 is varied in the same sense and preferably to the same degree as the volume of the audible sound is varied by the control element 41.

In some instances it is desirable that information relative to the auditorium sound level be available at other locations, such as in the theatre manager's office 3. In such instance an additional pair of leads 46 is connected in parallel with the leads 35. The leads 46 extend to an indicating unit 47 substantially identical with the indicating apparatus in the projection booth, except that a single indicating tube 48 is usually sufficient.

When the system is set in operation, the supersonic projector will project its supersonic compressional wave energy which, when intercepted by the receiver 7, produces an indication in the indicator tubes 32 and 38. The booth operator adjusts the control member 45 until the shadow on one of the tubes 38 is of a predetermined width which is used to indicate proper operating conditions. Preferably at the beginning of each daily performance, the auditorium observer aurally observes the sound level. If it is too high, he adjusts the control knob 34 to increase the gain of the amplifier 8 so that the shadow on the indicator tube 32 is reduced. This simultaneously reduces the shadows on each of the tubes 38 in the projection booth which gives an indication to the booth operator to reduce the sound level by adjusting the control member 45. As the audible sound level falls, the supersonic level will also fall, due to the joint operation of the elements 41 and 44. The response of the receiver 7 to the reduced supersonic level increases the size of the shadow on the indicator tubes. When the shadow on each indicator tube reaches the normal width, the operator ceases further adjustment of the member 45. If the sound level is still too high, the auditorium observer again increases the gain of the amplifier 8 until the booth operator further reduces the sound level. If the sound level is too low, the auditorium observer reduces the gain of the amplifier 8 which gives to the booth operator an indication to increase the sound level. When the sound level has been adjusted to a satisfactory level, it will be seen that the shadow on each of the indicator tubes will be of the predetermined width indicating proper operating conditions. Thereafter no further adjustment by the auditorium observer is required, the indicating action become fully automatic. For example, as the size of the audience increases, the attenuation of the audible sound will increase which requires increased volume to be supplied to the projector 5 to maintain the proper auditorium sound level. The supersonic vibrations will be subjected to the same attenuating factors so that the intensity reaching the receiver 7 will decrease, causing a decreased signal to be impressed on the indicator tubes which in turn will increase the shadow in each indicator tube beyond the predetermined point. Therefore the booth operator will adjust the member 45 for an increased sound level. When the shadow on each indicator tube has reached its normal size, the sound level in the auditorium will have been returned to the proper level. All variable attenuating influences in the sound will be compensated for in this way.

Figure 3:
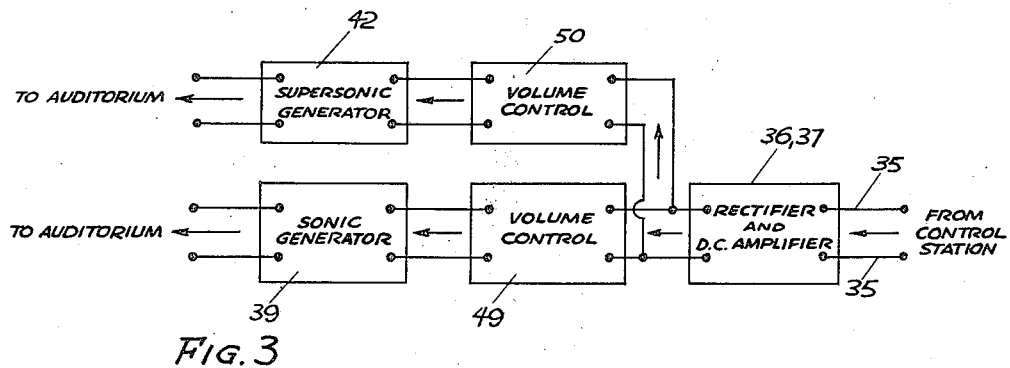
Fig. 3 is a fragmentary diagram of a modification of the system shown in Fig. 1.

Instead of relying upon the response of the booth operator to the visual indications of the indicating tubes, the system can be made fully automatic, as shown in Fig. 3, which represents an arrangement of the equipment in the projection booth. In this case, instead of the direct current output of the rectifier and direct current amplifier 36, 37 being used to modulate the shadow in the indicator tubes, such output is supplied to a pair of volume control devices 49 and 50 which control the volume of the sonic generator 39 and the supersonic generator 42 inversely in accordance with the direct current voltage applied thereto. Under these conditions it will be seen that the sound level in the auditorium automatically will be adjusted to and maintained at the proper level for varying conditions of sound attenuation in the auditorium.

Of course it is to be understood that this invention is not limited to the particular details as described above as many equivalents will suggest themselves to those skilled in the art. It is accordingly desired that the appended claims be given a broad interpretation commensurate with the invention within the art.

What is claimed is:

1. A sound control system comprising an auditorium, means for projecting supersonic compressional wave energy into said auditorium in a direction to be subjected to the same attenuating factors as those affecting audible sound supplied to said auditorium, and supersonic compressional wave energy responsive means for producing a control current in response to the intensity of said supersonic compressional wave energy and located at an auditorium station to intercept said supersonic compressional wave energy after it has been subjected to said attenuating factors.

2. A sound control system comprising an auditorium, means for projecting supersonic compressional wave energy into said auditorium in a direction to be subjected to the same attenuating factors as those affecting audible sound supplied to said auditorium, supersonic compressional wave energy responsive means for producing a control current in response to the intensity of said supersonic compressional wave energy and located at an auditorium station to intercept said supersonic compressional wave energy after it has been subjected to said attenuating factors, and means for producing an indication of said intensity in response to said control current.

3. A sound control system comprising an auditorium, means for projecting supersonic compressional wave energy into said auditorium in a direction to be subjected to the same attenuating factors as those affecting audible sound supplied to said auditorium, supersonic compressional wave energy responsive means for producing a control current in response to the intensity of said supersonic compressional wave energy and located at an auditorium station to intercept said supersonic compressional wave energy after it has been subjected to said attenuating factors, and means for adjusting the sensitivity of said supersonic compressional wave energy responsive means whereby the magnitude of said control current may be adjusted in accordance with the sound level conditions at said auditorium station.

4. A sound control system comprising an auditorium, means for projecting supersonic compressional wave energy into said auditorium in a direction to be subjected to the same attenuating factors as those affecting audible sound supplied to said auditorium, supersonic compressional wave energy responsive means for producing a control current in response to the intensity of said supersonic compressional wave energy and located at an auditorium station to intercept said supersonic compressional wave energy after it has been subjected to said attenuating factors, means for adjusting the sensitivity of said supersonic compressional wave energy responsive means whereby the magnitude of said control current may be adjusted in accordance with the sound level conditions at said auditorium station, control means located at a sound control station, and means for supplying said control current to said control means whereby the audible sound supplied to said auditorium may be adjusted in accordance with said control means.

5. A sound control system comprising an auditorium, means for projecting audible sound into said auditorium, means for projecting supersonic compressional wave energy into said auditorium in a direction to be subjected to the same attenuating factors as those affecting the audible sound, supersonic compressional wave energy responsive means for producing a control current in response to the intensity of said supersonic compressional wave energy and located at an auditorium station to intercept said supersonic compressional wave energy after it has been subjected to said attenuating factors, means located at a sound control station for simultaneously adjusting the output intensity of each of said projecting means in the same direction, means for adjusting the sensitivity of said supersonic compressional wave energy responsive means whereby the magnitude of said control current may be adjusted in accordance with the sound level conditions at said auditorium station, control means located at said sound control station, and means for supplying said control current to said control means whereby the audible sound and supersonic compressional wave energy supplied to said auditorium may be adjusted in accordance with said control means.

6. A sound control system comprising an auditorium, means for projecting audible sound into said auditorium, means for projecting supersonic compressional wave energy into said auditorium in a direction to be subjected to the same attenuating factors as those affecting the audible sound, supersonic compressional wave energy responsive means for producing a control current in response to the intensity of said supersonic compressional wave energy and located at an auditorium station to intercept said supersonic compressional wave energy after it has been subjected to said attenuating factors, means also located at said auditorium station for producing an indication of said intensity in response to said control current, means located at a sound control station for simultaneously adjusting the output intensity of each of said projecting means in the same direction, means for adjusting the sensitivity of said supersonic compressional wave energy responsive means whereby the magnitude of said control current may be adjusted in accordance with the sound level conditions at said auditorium station, control means located at said sound control station, and means for supplying said control current to said control means whereby the audible sound and supersonic compressional wave energy supplied to said auditorium may be adjusted in accordance with said control means.

7. A sound control system comprising an auditorium, means for projecting audible sound into said auditorium, means for projecting supersonic compressional wave energy into said auditorium in a direction to be subjected to the same attenuating factors as those affecting the audible sound, supersonic compressional wave energy responsive means for producing a control current in response to the intensity of said supersonic compressional wave energy and located at an auditorium station to intercept said supersonic compressional wave energy after it has been subjected to said attenuating factors, means also located at said auditorium station for producing a visual indication of said intensity in response to said control current, means located at a sound control station for simultaneously adjusting the output intensity of each of said projecting means in the same direction, means for adjusting the sensitivity of said supersonic compressional wave energy responsive means whereby the magnitude of said control current may be adjusted in accordance with the sound level conditions at said auditorium station, and visual signal means located at said sound control station and responsive to said control current to produce a visual indication of said intensity whereby the audible sound and supersonic compressional wave energy supplied to said auditorium may be adjusted in accordance with said intensity.

8. A sound control system comprising an auditorium, means for projecting supersonic compressional wave energy into said auditorium in a direction to be subjected to the same attenuating factors as those affecting audible sound supplied to said auditorium, supersonic compressional wave energy responsive means for producing a control current in response to the intensity of said supersonic compressional wave energy and located at an auditorium station to intercept said supersonic compressional wave energy after it has been subjected to said attenuating factors, control means located at a sound control station, and means for supplying said control current to said control means whereby the audible sound supplied to said auditorium may be adjusted in accordance with said control means.

9. A sound control system comprising an auditorium, means for projecting audible sound into said auditorium, means for projecting supersonic compressional wave energy into said auditorium in a direction to be subjected to the same attenuating factors as those affecting the audible sound, supersonic compressional wave energy responsive means for producing a control current in response to the intensity of said supersonic compressional wave energy and located at an auditorium station to intercept said supersonic compressional wave energy after it has been subjected to said attenuating factors, means located at a sound control station for simultaneously adjusting the output intensity of each of said projecting means in the same direction, control means located at said sound control station, and means for supplying said control current to said control means whereby the audible sound and supersonic compressional wave energy supplied to said auditorium may be adjusted in accordance with said control means.

10. A sound control system comprising an auditorium, means for projecting audible sound into said auditorium, means for projecting supersonic compressional wave energy into said auditorium in a direction to be subjected to the same attenuating factors as those affecting the audible sound, supersonic compressional wave energy responsive means for producing a control current in response to the intensity of said supersonic compressional wave energy and located at an auditorium station to intercept said supersonic compressional wave energy after it has been subjected to said attenuating factors, means located at a sound control station for simultaneously adjusting the output intensity of each of said projecting means in the same direction, control means located at said sound control station, means for supplying said control current to said control means whereby the audible sound and supersonic compressional wave energy supplied to said auditorium may be adjusted in accordance with said control means, and auxiliary means located at an auxiliary station to produce an indication of said intensity in response to said control current.

11. A sound control system comprising an auditorium, means for projecting audible sound into said auditorium, means for projecting supersonic compressional wave energy into said auditorium in a direction to be subjected to the same attenuating factors as those affecting the audible sound, supersonic compressional wave energy responsive means for producing a control current in response to the intensity of said supersonic compressional wave energy and located at an auditorium station to intercept said supersonic compressional wave energy after it has been subjected to said attenuating factors, means for adjusting the sensitivity of said supersonic compressional wave energy responsive means whereby the magnitude of said control current may be adjusted in accordance with the sound level conditions at said auditorium station, and control means located at said sound control station and responsive to the intensity of said control current for varying the output intensity of each of said projecting means inversely in accordance with the intensity of said control current.

HENRY SCHWARTZBERG.

REFERENCES CITED

The following references are of record in the file of this patent:

UNITED STATES PATENTS

| Number | Name | Date |
| --- | --- | --- |
| 1,616,639 | Sprague | Feb. 8, 1927 |
| 2,338,551 | Stanko | Jan. 4, 1944 |
| 2,343,115 | Noble | Feb. 29, 1944 |
| 2,409,139 | Magnuski | Oct. 8, 1946 |